United States Patent Office 3,210,629
Patented Oct. 5, 1965

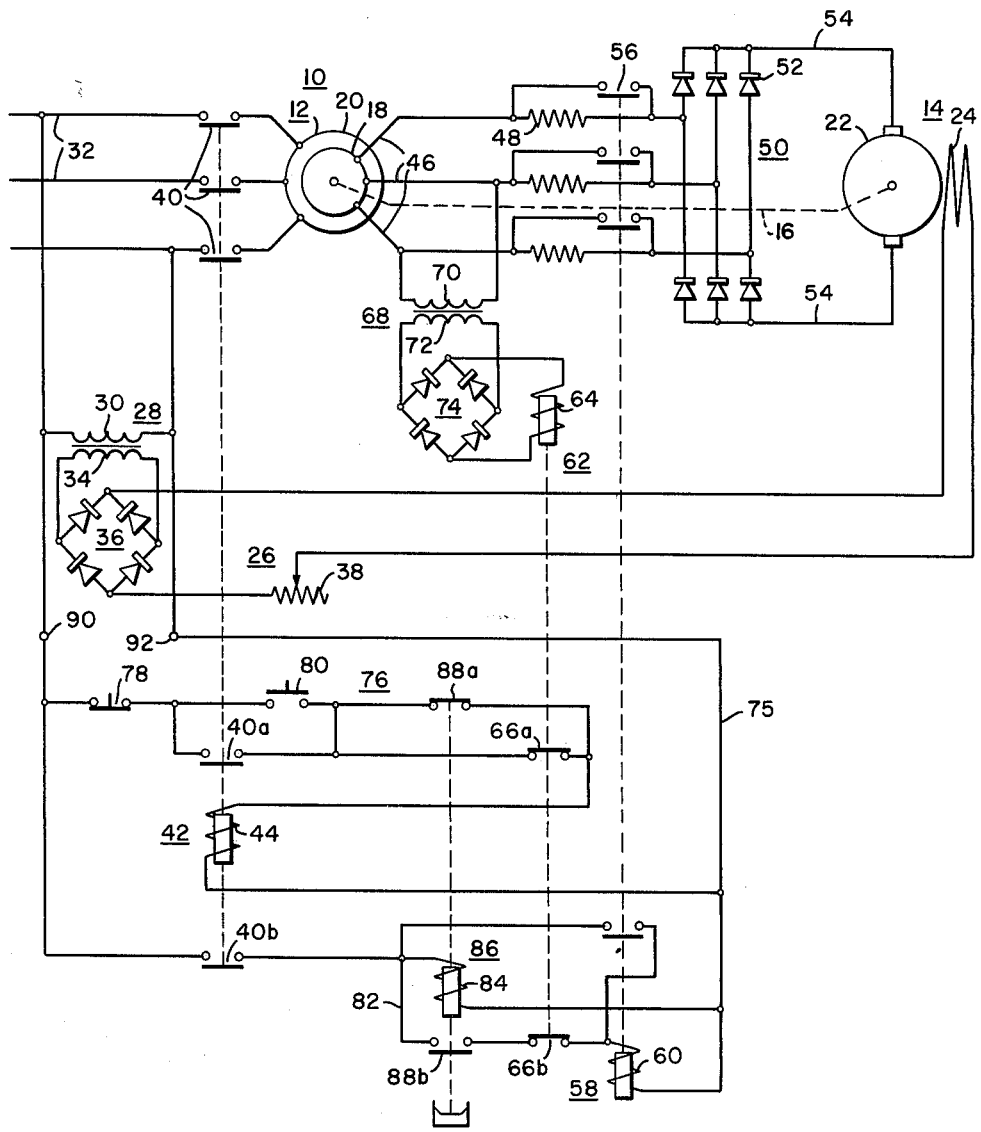

3,210,629
PLURAL CASCADE MOTOR CONTROL WITH STALL PREVENTION
Earl H. Hornbarger, Kenmore, and Nikolaus Onjanow, Buffalo, N.Y., assignors to Westinghouse Electric Corporation, East Pittsburgh, Pa., a corporation of Pennsylvania
Filed Mar. 30, 1962, Ser. No. 183,791
4 Claims. (Cl. 318—46)

The present invention relates to adjustable speed alternating current motor drives, and more particularly to a control system for disconnecting the drive from its power source in case the drive stalls or fails to start.

Essentially the drive consists of a wound rotor induction motor and a direct current motor, connected mechanically to the same output shaft and electrically one to the other through a semiconductor rectifier. The rectifier rectifies the slip power from the rotor of the induction motor and supplies direct current to the armature of the direct current motor. Speed control is obtained in the illustrated drive by changing the field current of the direct current motor, which is separately excited. Other methods of speed control may, of course, be used. The drive starts as a conventional wound rotor induction motor with starting resistance in the rotor circuit.

In known drives of this type the size of the slip rectifier is determined by the amount of the slip power which must be rectified. To a large extent this is a function of the rotor voltage. The rotor voltage increases as the speed decreases. Since the rectifiers normally used are silicon rectifiers which are very sensitive to voltage surges, they must be designed to accommodate the highest possible voltage surge which might occur under any condition of operation. This is determined, mainly, by the open circuit rotor voltage at zero speed. The base operating speed of this type of adjustable speed drive is usually one-third to one-half its top speed, and at such base speeds, the rotor voltage is two-thirds or one-half, respectively, of its value at zero speed. It has been the usual practice to select rectifiers of a voltage strength based on full open circuited rotor voltage, at zero speed.

Thus, it is apparent that it would be very desirable to be able to select rectifiers on the basis of rotor voltage at base operating speed, instead of zero speed. However, this has not been possible because of the possibility of stalling or failure to start. Since the starting resistance limits the voltage applied to the rectifier during the initial accelerating period, it would be desirable to provide control means which would shut the machine down and disconnect it from its power source in the event of stalling or failure to start, thereby enabling the use of rectifier diodes based on the rotor voltage at base operating speed.

Therefore, the principal object of the present invention is to provide an improved control system for alternating current adjustable speed drives which will employ more economical rectifiers in the alternating current rotor circuit.

Another object of the invention is to provide an improved control system for an alternating current adjustable speed drive which will automatically deenergize the machine in the event of failure to start or stalling.

A further object of the invention is to provide an improved control system for an alternating current adjustable speed drive which will provide starting resistance for an alternating current motor until the machine reaches a predetermined speed and which will deenergize the machine in the event of failure to start or stalling.

A still further object of the invention is to provide an improved control system for an alternating current adjustable speed drive which will deenergize the drive in the event that the actuating mechanism for shunting the starting resistance is set to operate in too short a time interval during starting.

Other objects and advantages of the invention will be apparent from the following detailed description, taken in connection with the accompanying drawing, the single figure of which is a schematic diagram of an adjustable speed drive employing the control circuit of this invention.

Although the present invention is particularly applicable to an adjustable speed drive of the types shown in the drawing and similar to the type of alternating current adjustable speed drive shown and described in Patent No. 2,970,249, issued January 31, 1961, by V. N. Mazur and assigned to the Westinghouse Electric Corporation, it will, of course, be understood that the invention is not limited thereto but in its broader aspects may be employed in other types of adjustable speed drives utilizing an alternating current motor and may be used where stalling protection is required for simple alternating current motors.

Referring now to the drawing, there is illustrated an alternating current adjustable speed drive 10 which includes an alternating current motor 12 and a direct current motor 14 coupled on a common output shaft 16. The alternating current motor 12 has a three-phase wound rotor or second winding 18 and three-phase stator or primary winding 20. The direct current motor 14 includes a direct current wound armature 22 and a separately excited field winding 24. Of course, the field winding 24 may be a shunt winding if desired.

Any suitable direct current power supply may be provided to excite the direct current field 24. By way of example, a power supply 26 is illustrated in the drawing which includes a transformer 28 having a primary winding 30 connected to the incoming power line 32. The secondary winding 34 is connected across the input of a full wave rectifier bridge 36 to convert alternating current from the incoming power line 32 to direct current for exciting the field 24 of the direct current motor 14. An adjustable rheostat 38 in series with the field 24 makes it possible to control speed simply by adjusting the field strength of the direct current motor 14.

The primary or stator winding of the alternating current motor 10 is supplied from the incoming power line 32 through a set of contacts 40 of main contactor 42 which contacts 40 are actuated by main contactor coil 44. Slip power is supplied to the armature 22 of the direct current motor by conductors 46 connected to the alternating current rotor 18 by any suitable current collecting means, as for example slip rings, through the starting resistors 48 and a three-phase rectifier bank 50 preferably employing silicon diode rectifiers 52. The output of the rectifier bank 50 is supplied to the armature 22 through conductors 54. The armature voltage is applied conventionally through a commutator (not shown). A set of contacts 56, actuated by coil 60 of starting resistance shunting relay 58, are employed to shunt the resistors 48 when the motor drive reaches base speed.

An alternating current adjustable speed drive has been described which consists of a wound rotor induction motor 12 and a direct current motor 14 coupled on the same output shaft 16. A rectifier 50 is provided to supply rectified slip power from the rotor 18 of the induction motor 12 to the armature 22 of the direct current motor 14. The direct current motor converts the slip power to mechanical output. The field of the direct current motor is separately excited to permit speed control by adjustment of rheostat 38.

The operation of the alternating current part of the drive is like that of a conventional wound rotor motor. The direct current machine, on the other hand, provides unique characteristics. A counter E.M.F. is generated by the direct current motor that bucks the rectified alternating current rotor circuit voltage. The difference between these voltages is such that the rectified rotor circuit voltage is just sufficient to circulate load current through the alternating current rotor, the rectifier and the direct current armature. If the direct current motor field is weakened during operation, the generated counter electromotive force decreases, allowing more current to flow. This produces more torque in both alternating current and direct current machines and the drive accelerates to a higher speed. As the speed increases, the rotor slip voltage decreases and the counter E.M.F. increases. Acceleration ceases when these voltages differ by the amount required to circulate running load current at the new speed. It can be seen from the above-described operation of the drive that the secondary alternating current voltage is proportion to the slip of the wound rotor motor 12. In order to prevent damage to the slip rectifiers 50 under stall or failure to start conditions, a control circuit is provided to shut down the motor in case of failure to start or in case of stall.

The stall protection control network includes a rotor voltage sensing relay 62 having an actuating coil 64 and a contactor 66 including contacts 66a and 66b. The coil 64 is excited by rectified alternating current rotor voltage. A transformer 68 may be employed and may be connected across one phase of the output of the alternating current rotor 18. The output of the secondary winding 72 of the transformer 68 is connected across the coil 64 through a rectifier bridge 74. At the start the voltage is maximum and the relay 62 picks up. The relay 62 is adjustable and is set to drop out when the motor accelerates to a speed at which its rotor voltage has declined to a value within the voltage rating of the silicon diode slip rectifier 50.

Connected across one phase of the incoming line 32 is a first branch 76 of the stall protective control network. Branch 76 includes a stop push-button 78, a start push-button or starting switch 80, and the main contactor coil 44 in series. As illustrated in the drawing, a main contactor auxiliary contact 40a is connected across the stationary contacts of the starting switch 80 to serve as a locking or holding contactor. A second branch 82 of the stall protective control network includes a pair of main contactor contacts 40b connected in series with actuating coil 84 of a time delay relay 86.

The time delay relay 86 includes a contactor 88 having contacts 88a and 88b. The time delay relay 86 is shown as having a dashpot 90 for effecting time delay. It should be understood, of course, that this dashpot is diagrammatic only and represents any suitable time delay means. The relay 86 may be of any suitable time delay type in which the contacts are actuated upon expiration of a preselected time interval after energizing coil 84. The contacts 88b of time delay relay 86 are normally open but closed when energized after a preselected time interval has elapsed after energization of coil 84. The sensing relay contacts 66a and 66b are normally closed and open when relay coil 64 of relay 62 is effectively energized. Relay contacts 56 of resistance shunting relay 60 are normally open contacts which are actuated to closed position when coil 60 is energized. Contacts 66a of relay 62 and 88a of relay 86 are connected in parallel and the parallel connected contacts are connected in series in the first branch of the stall protective network in series with the main contactor coil 44 and push-buttons 78 and 80. In the second branch 82 of the stall protective control network 75, relay contacts 66b of relay 62 and contacts 88b of relay 86 are connected in series with actuating coil 60 of relay 58 across actuating coil 84 of relay 86.

Terminals 90 and 92 are provided on each side of the parallel connected first and second branches of the control network for connecting the coils 44, 84 and 60 to a power source. As shown in the drawings, the terminals 90 and 92 are connected across one phase of incoming power line 32 but it will of course be understood that any suitable source of power may be employed.

In a normal starting operation, the starting switch or push-button 80 is moved to closed position. Since the contacts 88a are normally closed the coil 44 of main contactor 42 is energized to close the contacts 40, 40a and 40b. This connects the alternating current motor drive to its source of power. Closing of contacts 40b energizes the coil 84 of time delay relay 86 which starts its cycle. When the motor drive accelerates to a speed at which the rotor voltage of the alternating current motor has declined to a value within the silicon diode voltage rating, which is selected to be the base operating speed of the drive, the relay coil 64 is no longer effectively energized and the relay 62 drops out thereby closing contacts 66a and 66b. The time delay relay 86 is set to operate after relay 62 drops out. Thus, after relay 62 drops out, contacts 88a in the first branch 76 of the stall protective control network 75 opens and contact 88b closes. Now both contact 88b and 66b to coil 60 of relay 58 are closed energizing coil 60 which operates to close the contacts 56 shunting out the starting resistance 48.

Assuming that the machine fails to start: The rotor voltage of the alternating current machine does not drop to a value sufficient to drop out the relay 62. Contact 66b remains open, coil 60 is not energized and the contacts 56 remain open leaving the starting resistance 48 in the circuit. Contact 66a also remains open and relay 86 times out, opening contacts 88a and thereby deenergizing coil 44 of main contactor 42, opening the contacts 40 and disconnecting the motor from the power line 32. The drive then stops.

Now, assume the machine stalls during normal operation: As the machine slows down, the secondary voltage of the alternating current machine increases. When the speed has declined to a value at which the rotor voltage exceeds the preselected value effective to energize the coil 64 of relay 62, the contacts 66a open. Since the relay 86 has already timed out, contacts 88a to coil 44 in branch 76 are opened. Thus, upon opening of contacts 66a the coil 44 becomes deenergized dropping out contacts 40 thereby shutting down the motor. An additional protective function is achieved by this unique control network. If the time delay relay 86 is not set for a long enough period, the drive will shut down. The time delay relay 86 must be set to operate after an interval slightly longer than that normally required for the machine to accelerate to the speed at which relay 62 will drop out. Otherwise, when relay 86 operates, contacts 88 will open and since contact 66a has not yet closed, the coil 44 will be deenergized opening contacts 40 of main contactor 42.

It will now be apparent that a protective control network has been provided which permits the use of slip rectifiers that can be rated for the actual rotor voltage at base operating speed instead of the full open circuited rotor voltage. This results in considerable savings in cost. Further advantageous features of the circuit are apparent, as for example if the machine fails to start, or stalls while operating at base speed, it will be shut down. Further, if the accelerating time delay relay is not set for a sufficient accelerating interval, the drive will shut down. Although this protective network has been shown and described for use in an alternating current adjustable speed drive, it will be apparent that it is not limited thereto, in accordance with the broader aspects of the invention. This network for example will be effective to prevent stalling in other types of alternating adjustable speed drives employing alternating current motors as well as to protect a simple alternating current motor against stalling and failure to start.

A certain specific embodiment of the invention has been shown and described for the purpose of illustration, but it will be apparent that various modifications and other embodiments are possible within the scope of the invention. It is to be understood, therefore, that the invention is not limited to the specific arrangement shown, but in its broadest aspects, it includes all equivalent embodiments and modifications which come within the scope of the invention.

We claim as our invention:

1. In a stall-protected adjustable speed drive comprising an alternating current motor and a direct current motor, a rectifier, means for connecting the rotor of said alternating current motor to the input of said rectifier and connecting the output of said rectifier to the armature of said direct current motor, whereby the rectified slip voltage of the alternating current is applied to the armature of the direct current motor; a control network comprising a sensing relay having a coil effectively energized by rotor voltage generated from zero speed to a preselected maximum speed of said rotor and a contactor having normally closed contacts, open when said sensing coil is energized, a main contactor for connecting the drive to a power source and a main coil for operating said main contactor, a time delay relay having an actuating coil and a conductor having normally closed contacts opened after a time delay when said actuating coil is energized, said time delay relay contacts and said sensing relay contacts connected in parallel, said parallel connected contacts being connected in series with a starting switch and said main contactor coil.

2. In a stall-protected adjustable speed drive comprising an alternating current motor and a direct current motor, a rectifier, a resistor, means for connecting the rotor of said alternating current motor to the input of said rectifier through said resistor and means connecting the output of the rectifier to the armature of said direct current machine, coil actuated contactor shunting said resistor; a control network comprising a rotor voltage sensing relay having a coil responsive to rotor voltage connected over said rotor and a contactor, a main contactor having an actuating coil, a time delay having an actuating coil and a plurality of contacts, a starting resistance relay having an actuating coil and including said resistor shunting contactor, a first branch in said network comprising, a normally closed contactor of said delay relay and a normally closed contactor of said voltage sensing relay connected in parallel said parallel connected contactors connected in series with a starting switch and said main contactor coil, a second branch in said network comprising said starting resistance relay coil, normally open time relay contacts and normally closed rotor voltage sensing relay contacts connected in series across said time delay relay coil and a main contactor having contacts connected in series with said second branch, said first and second branches of said control network connected in parallel, said rotor voltage relay being set to drop out when said drive reaches a predetermined speed whereby the rotor voltage decreases to the minimum effective voltage level of the rotor voltage relay and the time delay relay being set to operate its contacts subsequent to the drop out of the rotor voltage relay, whereby the resistor shunt contactors close when the drive reaches a predetermined speed and the main contactor opens when the speed of the drive falls below a predetermined speed.

3. In an adjustable speed drive including an alternating current wound rotor induction machine and a direct current machine mechanically connected together and having rectifier means electrically connected between the rotor circuit of the alternating current machine and the armature of the direct current machine; switching means for connecting said alternating current machine to a power source, relay means responsive to the rotor voltage of the alternating current machine for effecting opening of said switching means when said rotor voltage exceeds a predetermined value, and time delay means for preventing opening of the switching means for a predetermined time after closure of the switching means.

4. In an adjustable speed drive including an alternating current wound rotor induction machine and a direct current machine mechanically connected together and having rectifier means electrically connected between the rotor circuit of the alternating current machine and the armature of the direct current machine; switching means for connecting said alternating current machine to a power source, said switching means having an operating coil for effecting closure of the switching means when the operating coil is energized, relay means responsive to the rotor voltage of the alternating current machine for effecting deenergization of said operating coil when said rotor voltage exceeds a predetermined value, and time delay relay means for maintaining energization of said operating coil for a predetermined time interval after the operating coil is initially energized to close the switching means.

References Cited by the Examiner

UNITED STATES PATENTS

| 2,085,116 | 6/37  | McShane    | 318—447   |
| 2,686,895 | 8/54  | Feldhausen | 318—485 X |
| 3,059,159 | 10/62 | Reza       | 318—46    |

FOREIGN PATENTS 1,082,340   5/60   Germany.

ORIS L. RADER, *Primary Examiner.*